March 12, 1929.  I. A. HILLS ET AL  1,705,329
LIQUID PURIFIER, GRAVITY TYPE
Filed July 2, 1925   3 Sheets-Sheet 1
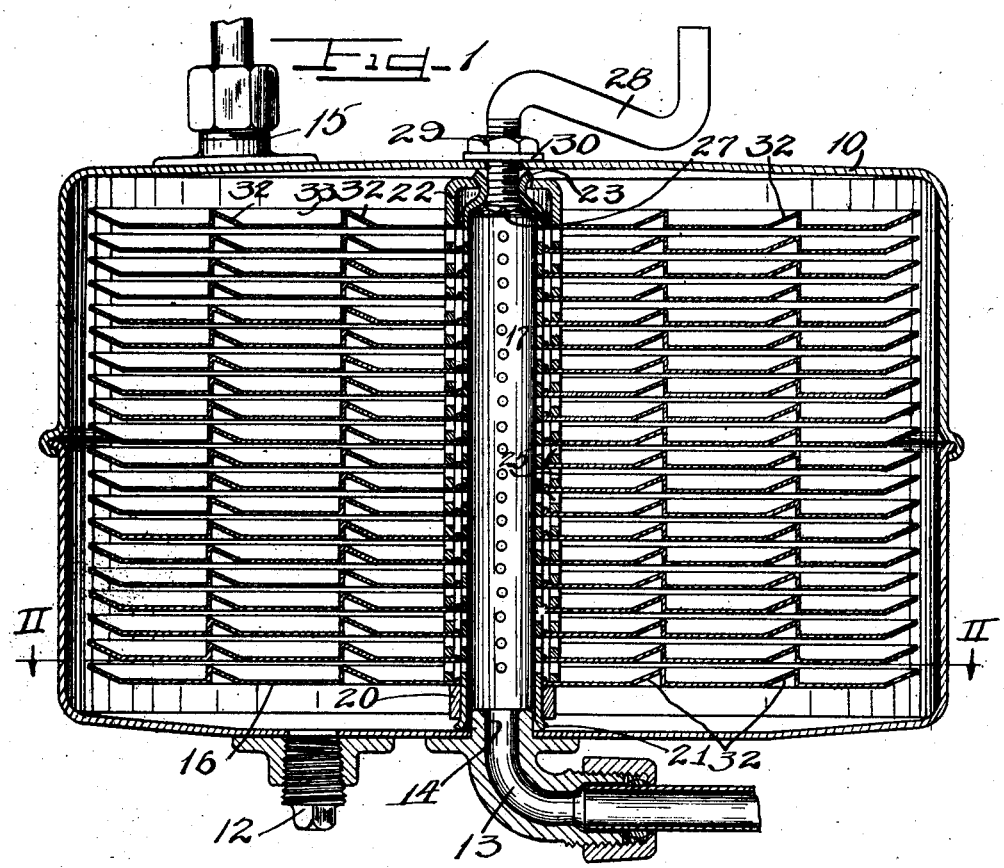
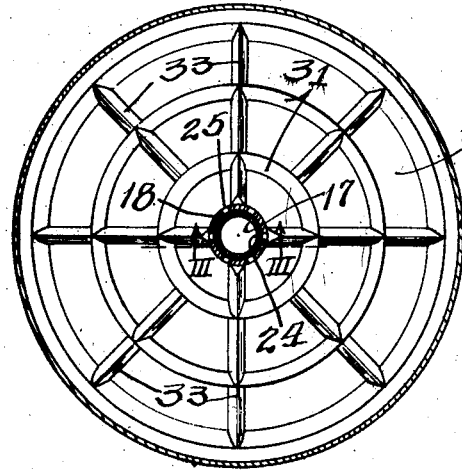
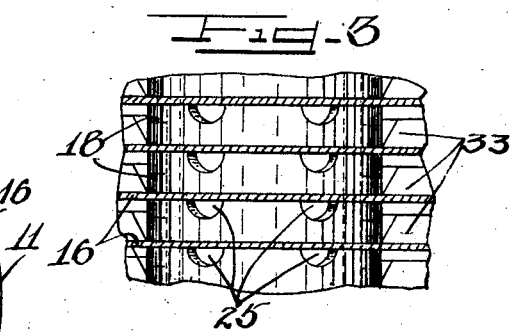
Inventors.
Isaac Arthur Hills
Gordon B Hooton
by Charles W. Niell
Attys.

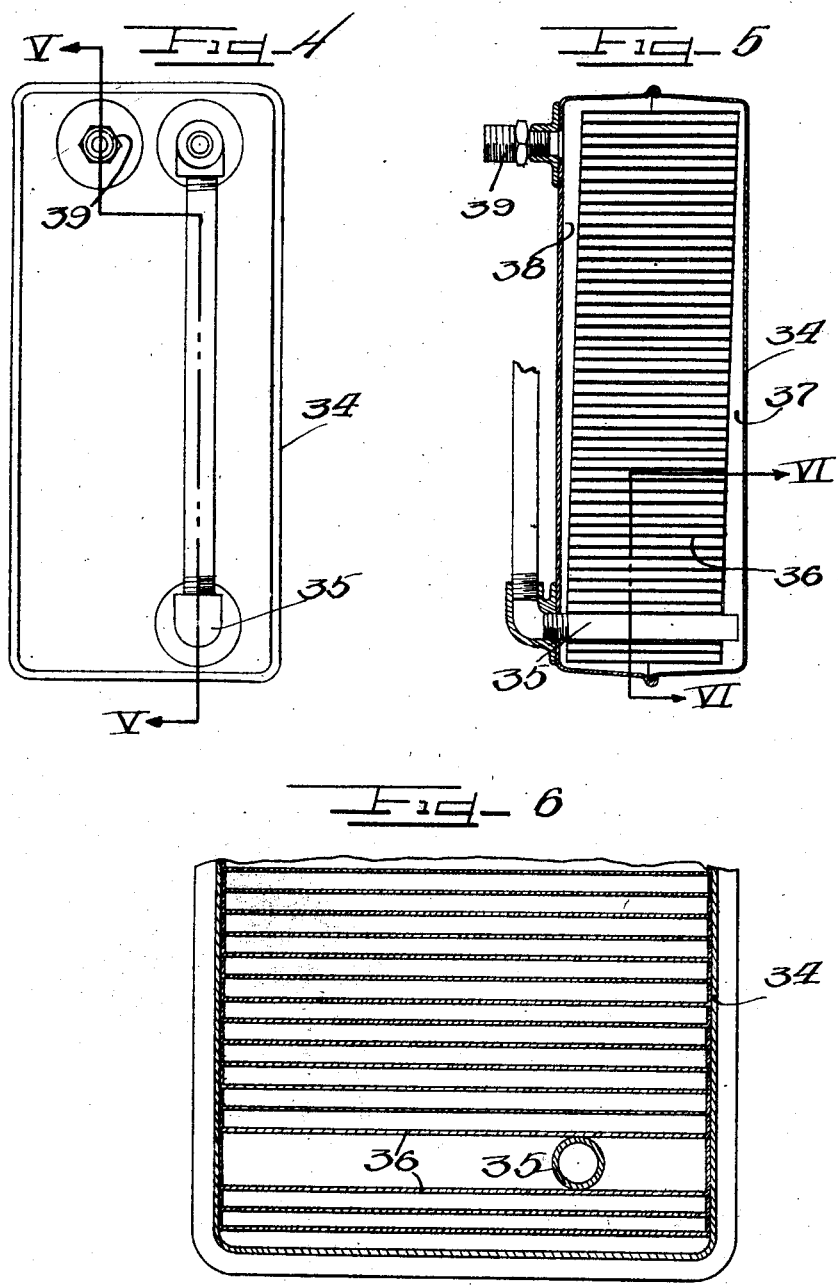

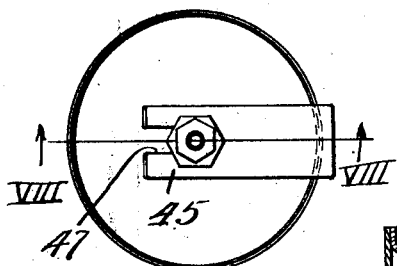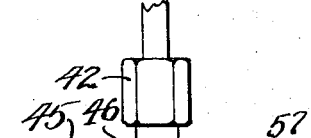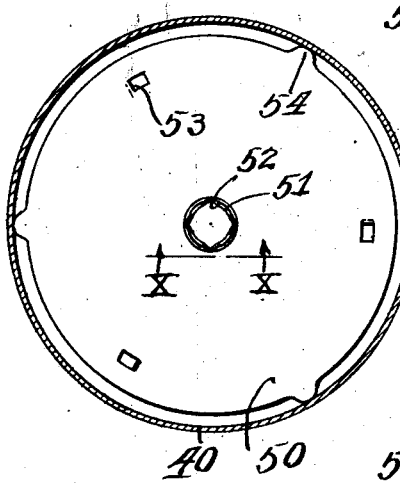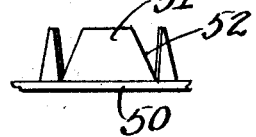

Patented Mar. 12, 1929.

1,705,329

UNITED STATES PATENT OFFICE.

ISAAC ARTHUR HILLS AND GORDON B. HOOTON, OF GRAND RAPIDS, MICHIGAN; SAID HILLS ASSIGNOR TO SAID HOOTON.

LIQUID PURIFIER, GRAVITY TYPE.

Application filed July 2, 1925. Serial No. 40,981.

This invention relates to settling filters or oil purifiers, with particular reference to fuel and oil purifiers used in connection with internal combustion engines.

It is an object of this invention to provide a device insertable in fluid lines adapted to provide for gravity settling of impurities within the shortest possible vertical distance. An important advantage of gravity settling or filtration is that such a device can be inserted in the pressure lubricating line of an engine to remove grit and impurities from the oil before reaching the bearings, without any possibility of the flow of oil being stopped by clogging of a filter.

It is also an object of this invention to provide a series of settling members mounted on a common fluid manifold so that the several members will act in parallel to give a large settling surface with a minimum distance for individual particles of sediment to fall through, so that the entire contents of the settler will be clarified over night, providing a supply of clean oil, equal to the capacity of the settler, upon starting the engine in the morning.

It is another object of this invention to provide a sediment settler capable of rapid and easy cleaning by rotation of the disc and tube assembly to throw off the accumulated sediment into the container, from which the sediment may be drained.

It is a further object of this invention to provide a settling chamber having a series of superimposed discs therein, with a central distribution of fluid to each disc, the discs being provided with outwardly sloping concentric ridges and an upturned rim adapted to form sediment traps, whereby the fluid is distributed over a number of discs and flows outwardly over the discs with decreasing velocity.

It is still a further object of this invention to provide a sediment separating apparatus of the utmost compactness, simplicity, and economy of construction that is without adjustments and correspondingly fool-proof.

Other and further important objects of this invention will be apparent from the disclosures in the specification and the accompanying drawings.

This invention (in a preferred form) is illustrated in the drawings and hereinafter more fully described.

On the drawings:

Figure 1 is a cross section of one form of device embodying the features of this invention.

Figure 2 is a section on the line II—II of Figure 1, showig a plan view of one of the settling discs to a reduced scale.

Figure 3 is a fragmentary enlarged section on the line III—III of Figure 2, showing the spacing rings between discs.

Figure 4 is an elevation of a modified form of the device of this invention.

Figure 5 is a section on the line V—V of Figure 4.

Figure 6 is an enlarged section on the line VI—VI of Figure 5.

Figure 7 is a top plan view of another modification.

Figure 8 is an enlarged section on the line VIII—VIII of Figure 7.

Figure 9 is a section on the line IX—IX of Figure 8.

Figure 10 is an enlarged fragmentary elevation of the central spacing flanges of the individual plates.

As shown on the drawings:

The form of device shown in the first three figures comprises upper and lower halves 10 and 11 uniting to form a closed pressure resisting vessel which is conveniently of cylindrical form which may be formed as a part of the oiling system in a specific installation, as in the oil sump of an internal combustion engine. The lower half of this chamber is preferably slightly dished to provide a sediment or settling chamber having a drainage plug 12. Centrally of the bottom a fluid inlet 13 is provided having a boss 14 projecting into the vessel to provide a bearing for the settling elements hereinafter to be described. The upper half of the vessel is provided with a fluid outlet 15, the inlet and outlet being connected into the liquid line, in the case of an oiling system either on the suction or discharge side of the oil pump. In the former case the lubricating system may be of the "dry sump" type wherein this vessel or casing forms the main oil reservoir.

The settling elements comprise a series of discs 16 assembled on a tube 17 having spacers 18 locating the discs. These spacers have sufficient inside diameter to leave ample clearance around the tube for both oil and foreign matter distribution. The assembly is secured in place by a bottom ring 20 which is held on the tube 17 by expanding the same at the bottom at 21 and necking the tube down to receive a cap 22 at the top and again expanding the tube at 23. A series of perforations 24 in the tube match with grooves 25 in the spacers to supply oil to the separate discs, the tube serving as a distributing manifold. The lower end 21 of the tube fits over the inlet boss 14 which serves as a pilot therefor, the entering oil passing up the tube and out the perforations in the tube onto the discs where it expands in all directions, flowing towards the periphery of the discs at an ever decreasing velocity which gives foreign matter every opportunity to settle out. The fluid passes beyond the edge of the discs into the space 26 surrounding the periphery of the discs and thence rises to the top of the vessel and across the top disc to the outlet.

The upper reduced end 23 of the tube 17 has the end 27 of a crank 28 secured thereto, the crank passing through a central hole in the vessel cover and having a packing nut 29 threaded thereon to compress a gasket 30 to make the assembly oil tight when it is not desired to clean the discs by rotating the crank.

To prevent the impurities which come to rest upon the plates from being washed off again by the current, or from sliding off by gravity should the vessel be tipped, each plate may be stamped with a series of concentric rings 31 having an outwardly sloping wall 32 which act as partitions of low height and divide the upper surface of each disc into a series of shallow pans which retain the impurities even when the filter is tipped at a considerable angle. The outwardly sloping form of these ridges as well as the rim of the discs is provided in order that the impurities may slide thereover during the process of centrifugal cleaning of the discs. Ridges 33 running radially may be employed to stir up the sediment during the cleaning operation.

The normal operation of the filter involves entry of dirty fluid through the fitting 14 and up the tube 17 thence out over the various discs and up the walls of the vessel. The space below the lowermost disc serves as an additional settling chamber which has practically no fluid flow so that in normal operation the entire contents of the vessel becomes clarified by a few hours standing because of the short distance any given particle has to fall before reaching a trapping surface. It will be evident that the direction of oil flow may be reversed if desired.

To clean out the vessel and remove the impurities from the discs, after loosening the packing nut 29 on the crank 28, the crank is rapidly rotated to mix the impurities on each plate with the fluid immediately above them, and throw the entire mass by centrifugal force out into space 26 from which it is drained by removing the drain plug in the bottom of the vessel. Further cleaning can be accomplished by refilling the settler with gasoline or other solvent and again spinning the discs by means of the handle 28, followed by a second draining.

The modification shown in Figures 4 to 6 discloses a multiple plate settling chamber without the centrifugal cleaning feature. In this modification the general form of the containing vessel 34 is preferably shaped to conform to the available space, as for mounting on the front of the dash board of an automotive vehicle. The fluid is brought into the vessel by an inlet pipe 35 extending close to the opposite wall thereof to deliver the inflowing liquid to the right of a stack of horizontal superimposed parallel plates 36 arranged to slightly overhang to give an upwardly diminishing clearance 37 on the inflowing side and an increasing clearance 38 on the opposite or outflowing side shown as the left hand side of Figure 5. The clearance space 38 is tapped near the top for an outlet connection 39. The superimposed plates 36 divide the vessel into a large number of shallow settling chambers acting in parallel, so that individual particles of sediment have a minimum distance to fall and the velocity of the fluid is greatly checked by being spread out over such a large surface so that optimum settling conditions are obtained. The settling plates may be cleaned by tilting and shaking the entire tank assembly and drawing off the accumulated sediment.

The third embodiment of this invention shown in Figures 7 to 10 comprises a cylindrical vessel or tank 40 having detachable inlet and outlet connections 41 and 42 at the top and bottom thereof respectively. A mounting bracket 43 is shown in connection therewith to facilitate attachment to the dash board of a vehicle with quick removal of the vessel proper when it is desired to remove the vessel for cleaning. The tank is held at the bottom by the hook 44 engaging the rim of the tank, and at the top by a bifurcated spring-like extension 45 of the bracket that slips over and around the outlet connection 42, holding the tank by springing down around the nut 46 with the nut projecting through a suitably enlarged hole at the base of the spring slot 47. To remove the tank, the spring extension is lifted to disengage from the nut when the tank can be tilted out from under the spring, after disengaging the oil pipe connections. To prevent the oil in the tank from flowing out as the inlet is disconnected, a ball check 48 is positioned on the inner end 49 of the inlet connection.

In this modification the stack of discs 50 are made with integral central spacing flanges 51, slightly conical in form to nest as shown, and having slots 52 cut in said flanges to provide the necessary outlets from the central distributing manifold formed by the stack of discs with their flanges forming the central tube. Lugs 53 are punched in the plates to form aligning spacers, alternate plates being assembled with the lugs in staggered relationship. Centering protuberances 54 are shown on the periphery of the discs to contact the walls of the tank.

The top disc 55 differs from the others in that the center flange is closed to form a cup 56 which seals the top of the distributing manifold and serves as a centering boss for the spring 57 which holds the disc assembly from movement.

To clean this filter it is disconnected from the oil line, removed from the bracket, and shaken to stir up the sediment, which can then be poured out through the outlet.

We are aware that many changes may be made, and numerous details of construction may be varied through a wide range without departing from the principles of this invention, and we therefore do not purpose limiting the patent granted hereon, otherwise than necessitated by the prior art.

We claim as our invention:

1. A fluid purifier for removing foreign matter comprising a containing vessel adapted to be filled by liquid, a central perforated tube therein, a series of superimposed plates mounted in spaced relationship on said tube, and means for delivering the incoming fluid into said tube.

2. A fluid purifier for removing foreign matter comprising a containing vessel, a central perforated tube, a series of superimposed plates mounted in spaced relationship on said tube, means for delivering the incoming fluid into said tube, and means permitting rotation of said plates and tube to eject the accumulated foreign matter into the containing vessel by centrifugal force.

3. A fluid purifier for removing foreign matter comprising a containing vessel, a central perforated tube, a series of superimposed discs having concentric retaining ridges and mounted in spaced relationship on said tube, and means for delivering the incoming fluid into said tube.

4. A fluid purifier for removing foreign matter comprising a containing vessel, a central perforated tube, a series of superimposed discs having concentric retaining ridges and mounted in spaced relationship on said tube, means for delivering the incoming fluid into said tube, and means permitting rotation of said discs and tube to eject the accumulated foreign matter into the containing vessel by centrifugal force.

5. A device of the class described comprising a containing vessel forming part of the lubricating system of an engine, an oil distributing manifold formed therein, a plurality of superimposed spaced plates mounted on said manifold, and means for admitting the lubricant to the interior of the manifold for distribution over the plates mounted thereon.

6. A device of the class described comprising a containing vessel forming part of the lubricating system of an engine, a perforated tube mounted vertically therein, a plurality of superimposed spaced plates mounted on said tube, means for admitting the lubricant to the interior of the tube for distribution over the plates mounted thereon, and means adapted to permit rapid rotation of the tube and plates at intervals to dislodge accumulated sediment therefrom.

7. A device of the class described comprising a containing vessel forming part of the lubricating system of an engine, a perforated tube mounted vertically therein, a plurality of superimposed spaced plates mounted on said tube, said plates having inclined riffles adapted to trap the sediment carried in the lubricant, and means for admitting the lubricant to the interior of the tube for distribution over the plates mounted thereon.

8. A device of the class described comprising a containing vessel forming part of the lubricating system of the engine, a perforated tube mounted vertically therein, a plurality of superimposed spaced plates mounted on said tube, said plates having inclined riffles adapted to trap the sediment carried in the lubricant, means for admitting the lubricant to the interior of the tube for distribution over the plates mounted thereon, and means adapted to permit rapid rotation of the tube and plates at intervals to dislodge accumulated sediment therefrom.

9. In a device of the class described, a plurality of superimposed members forming sediment traps arranged for parallel flow of the liquid therethrough, and means for cleaning said sediment traps by rotation of the members.

10. In a device of the class described, a container vessel, a central vertical inlet thereto forming an interior boss, a vertical perforated tube, one end of which is guided by said boss, means projecting through the wall of the vessel for rotating said tube, and a plurality of discs arranged in spaced relationship on said tube and adapted to form a plurality of settling chambers.

11. In a device of the class described, a container vessel, a central vertical inlet thereto forming an interior boss, a vertical perforated tube, one end of which is guided by said boss, means projecting through the wall of the vessel for rotating said tube, and a plurality of discs arranged in spaced relationship on said tube and adapted to form a plurality of settling chambers, said discs being formed with circumferential ridges outwardly inclined to normally trap the sediment from the fluid while the discs are stationary.

In testimony whereof we have hereunto subscribed our names.

ISAAC ARTHUR HILLS.
GORDON B. HOOTON.